US012481121B2

United States Patent
Wu et al.

(10) Patent No.: US 12,481,121 B2
(45) Date of Patent: Nov. 25, 2025

(54) SYSTEM AND METHOD OF CHANGEABLE LENS SELF-ADAPTIVE CONTROL AND COMPENSATION

(71) Applicant: Qisda Corporation, Taoyuan (TW)

(72) Inventors: Jou-Hsuan Wu, Taoyuan (TW); Chih-Wei Cho, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 385 days.

(21) Appl. No.: 18/318,683

(22) Filed: May 16, 2023

(65) Prior Publication Data

US 2024/0111127 A1    Apr. 4, 2024

(30) Foreign Application Priority Data

Sep. 30, 2022   (CN) .......................... 202211214865.9

(51) Int. Cl.
  *G02B 7/14*   (2021.01)
  *G02B 7/00*   (2021.01)
  *G03B 5/00*   (2021.01)
  *G06F 16/901*   (2019.01)

(52) U.S. Cl.
  CPC .............. *G02B 7/14* (2013.01); *G02B 7/005* (2013.01); *G03B 5/00* (2013.01); *G06F 16/9017* (2019.01); *G03B 2205/0084* (2013.01)

(58) Field of Classification Search
  CPC . G02B 7/14; G02B 7/005; G03B 5/00; G03B 2205/0084; G03B 21/14; G06F 16/9017; G05D 3/12
  See application file for complete search history.

(56) References Cited

U.S. PATENT DOCUMENTS

2020/0221004 A1*   7/2020   Watanabe ............ H04N 23/682

\* cited by examiner

*Primary Examiner* — James C. Jones

(57) ABSTRACT

A system and a method of changeable lens self-adaptive control and compensation are provided. The system includes a lens holder, an actuator, and a controller. The lens holder carries a plurality of types of lenses. The actuator is connected to the lens holder, and drives the lens holder to move. The controller is electrically connected to the actuator, and is configured to determine whether maximum predetermined output torsion of the actuator is incapable of driving the lens holder when the lens holder is at each of positions when controlling the actuator to drive the lens holder, and to build a lookup table corresponding to each of the positions. The controller is configured to record a position to be a broken point in the lookup table in response to the maximum predetermined output torsion being incapable of drive the lens holder when the lens holder is at the position.

20 Claims, 10 Drawing Sheets

|   |   |   |   |   |   |   |   |   |
|---|---|---|---|---|---|---|---|---|
|   |   |   |   |   |   |   |   |   |
|   |   |   |   |   |   |   |   |   |
|   |   |   |   |   |   |   |   |   |
|   |   |   |   |   |   |   |   |   |
|   |   |   |   |   |   |   |   |   |
|   |   |   | (−1,1) | (0,1) | (1,1) |   |   |   |
|   |   |   | (−1,0) | (0,0) | (1,0) |   |   |   |
|   |   |   | (−1,−1) | (0,−1) | (1,−1) |   |   |   |
|   |   |   |   |   |   |   |   |   |
|   |   |   |   |   |   |   |   |   |
|   |   |   |   |   |   |   |   |   |
|   |   |   |   |   |   |   |   |   |
|   |   |   |   |   |   |   |   |   |

FIG. 4

| (−1,1) | (0,1)<br>Positive x static frictional rotation speed<br>Negative x static frictional rotation speed<br>Positive y static frictional rotation speed<br>Negative y static frictional rotation speed<br>Positive x kinetic frictional rotation speed<br>Negative x kinetic frictional rotation speed<br>Positive y kinetic frictional rotation speed<br>Negative y kinetic frictional rotation speed | (1,1) |
|---|---|---|
| (−1,0) | (0,0) Center point | (1,0) |
| (−1,−1) | (0,−1) | (1,−1) |

FIG. 5

| (−1,1) | (0,1)<br>Positive x static frictional rotation speed<br>Negative x static frictional rotation speed<br>Positive y static frictional rotation speed<br>Negative y static frictional rotation speed<br>Positive x kinetic frictional rotation speed<br>Negative x kinetic frictional rotation speed<br>Positive y kinetic frictional rotation speed<br>Negative y kinetic frictional rotation speed<br>Not traveling in negative x direction | (1,1) |
|---|---|---|
| (−1,0) | (0,0) Center point | (1,0) |
| (−1,−1) | (0,−1) | (1,−1) |

FIG. 7

SYSTEM AND METHOD OF CHANGEABLE LENS SELF-ADAPTIVE CONTROL AND COMPENSATION

CROSS-REFERENCE TO RELATED APPLICATION

This application claims the priority benefit of China application serial no. 202211214865.9, filed on Sep. 30, 2022. The entirety of the above-mentioned patent application is hereby incorporated by reference herein and made a part of this specification.

BACKGROUND

Technical Field

The disclosure relates to a system and a method of control and compensation. Particularly, the disclosure relates to a system and a method of changeable lens self-adaptive control and compensation.

Description of Related Art

There may be different lenses for a projector depending on different projection sizes or projection distances. For a user with different requirements of projection venues, a projector with interchangeable lenses is relatively attractive compared with a one-time purchase of multiple projectors in response to different lenses. As a result, there is a demanding market for interchangeable-lens projectors. If a lens not planned to be supported during the development stage is to be added to the projector on the market, it requires not only redesign of motor parameters for driving the lens, but also re-update of firmware of the projector in a house of a user.

With temporal or environmental changes, components may be affected due to loss or thermal expansion and contraction under temperature, increasing a resistive force during travel of the motor driving the lens, affecting travel smoothness, and even causing a freeze.

In addition to the above reasons, individual lens tolerances may also be generated in optical engine components due to design tolerances. The individual lens tolerances may cause different performances of different lenses. During conventional development, motor drive parameters cannot change in response to the environment, so the motor drive parameters may generally be designed on the basis of the maximum individual tolerance and the minimum performance, which may lower down the overall performance to accommodate the maximum individual tolerance.

In addition, in a conventional projector where an optical engine is used with different lenses, a resistive force may be generated during movement of the lenses at a certain position in a certain direction, even causing a freeze without advancing.

Moreover, in a conventional projector where a boundary sensing function is not installed or not applicable, whether the lens has moved to the boundary cannot be known. In this case, the lens is likely to cause damage to edge components.

SUMMARY

The disclosure provides a system of changeable lens self-adaptive control and compensation, making self-adjustment of parameters for moving a lens in response to different lenses or temporal or environmental changes to achieve self-adaptive control and compensation.

The disclosure provides a method of changeable lens self-adaptive control and compensation, making self-adjustment of parameters for moving a lens in response to different lenses or temporal or environmental changes to achieve self-adaptive control and compensation.

An embodiment of the disclosure proposes a system of changeable lens self-adaptive control and compensation. The system includes a lens holder, an actuator, and a controller. The lens holder is configured to carry a plurality of types of different lenses. The actuator is connected to the lens holder and configured to actuate movement of the lens holder. The controller is electrically connected to the actuator. The controller is configured to determine, when controlling the actuator to drive the lens holder, whether maximum predetermined output torsion of the actuator is incapable of driving the lens holder when the lens holder is at each of positions, and to build a lookup table corresponding to each of the positions. The controller is configured to record a position to be a broken point in the lookup table in response to the maximum predetermined output torsion being incapable of driving the lens holder when the lens holder is at the position.

An embodiment of the disclosure proposes a method of changeable lens self-adaptive control and compensation. The method includes the following. An actuator is configured to drive a lens holder to move. The lens holder is configured to carry a plurality of types of different lenses. When the actuator is controlled to drive the lens holder, whether maximum predetermined output torsion of the actuator is incapable of driving the lens holder when the lens holder is at each of positions is determined, and a lookup table corresponding to each of the positions is built. A position is recorded to be a broken point in the lookup table in response to the maximum predetermined output torsion being incapable of driving the lens holder when the lens holder is at the position.

In the system and the method of changeable lens self-adaptive control and compensation of the embodiment of the disclosure, when the actuator is controlled to drive the lens holder, it is determined whether the maximum predetermined output torsion of the actuator is incapable of driving the lens holder when the lens holder is at each position, and a lookup table corresponding to each position is built. Moreover, a position is recorded to be a broken point in the lookup table in response to the maximum predetermined output torsion being incapable of driving the lens holder when the lens holder is at the position. As a result, in the system and the method of changeable lens self-adaptive control and compensation of the embodiment of the disclosure, self-adjustment of parameters for moving the lens can be made in response to different lenses or temporal or environmental changes to achieve self-adaptive control and compensation.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

FIG. 4 is a schematic diagram of coordinates within the movable range of the system of changeable lens self-adaptive control and compensation of FIG. 1A.

FIG. 5 is a schematic diagram of a torsion compensation table of the system of changeable lens self-adaptive control and compensation of FIG. 1A.

FIG. 7 is a schematic diagram of a torsion compensation table recorded with a broken point of the system of changeable lens self-adaptive control and compensation of FIG. 1A.

DESCRIPTION OF THE EMBODIMENTS

Figure 1A:
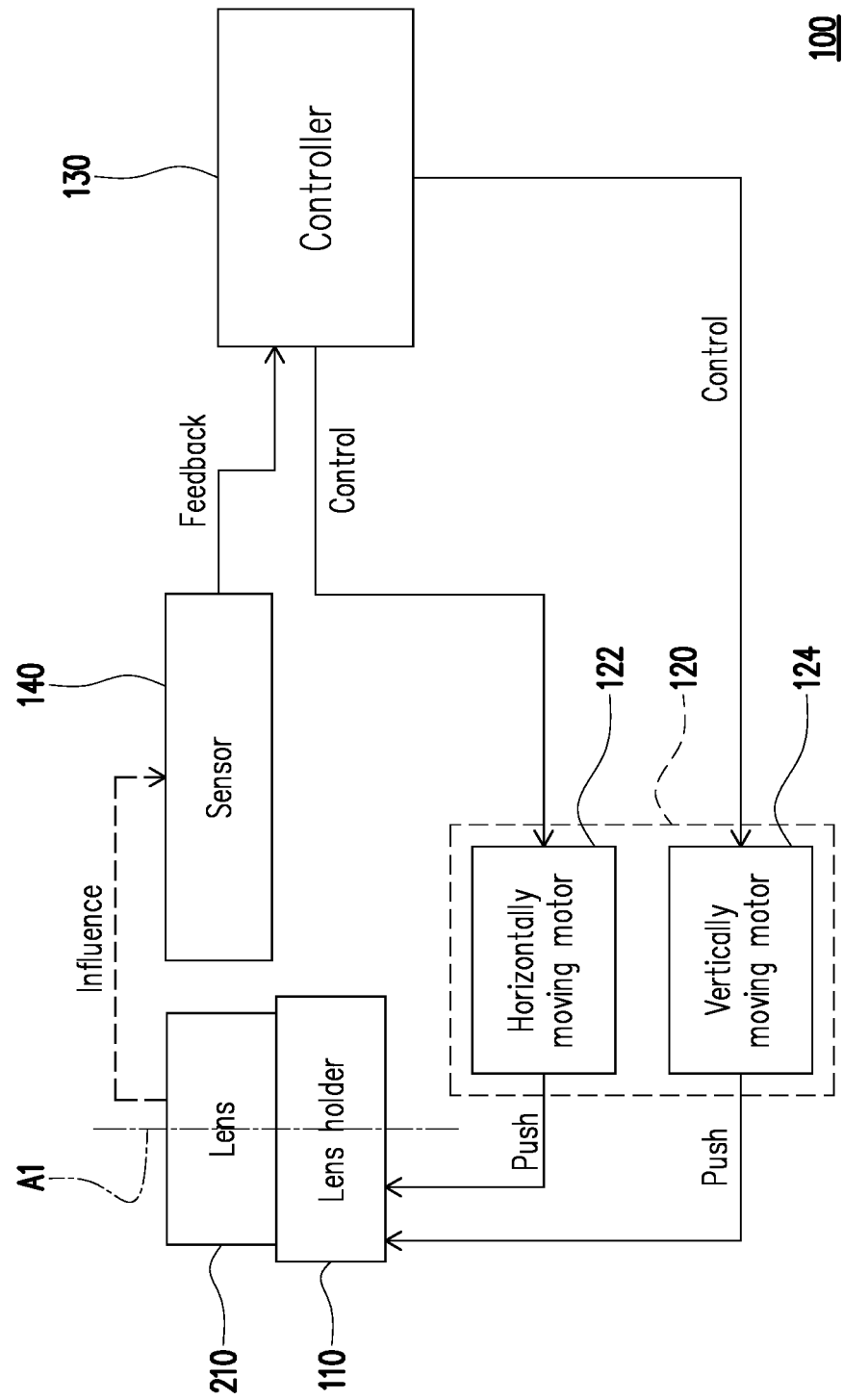
FIG. 1A is a block diagram of a system of changeable lens self-adaptive control and compensation of an embodiment of the disclosure.
Figure 1B:
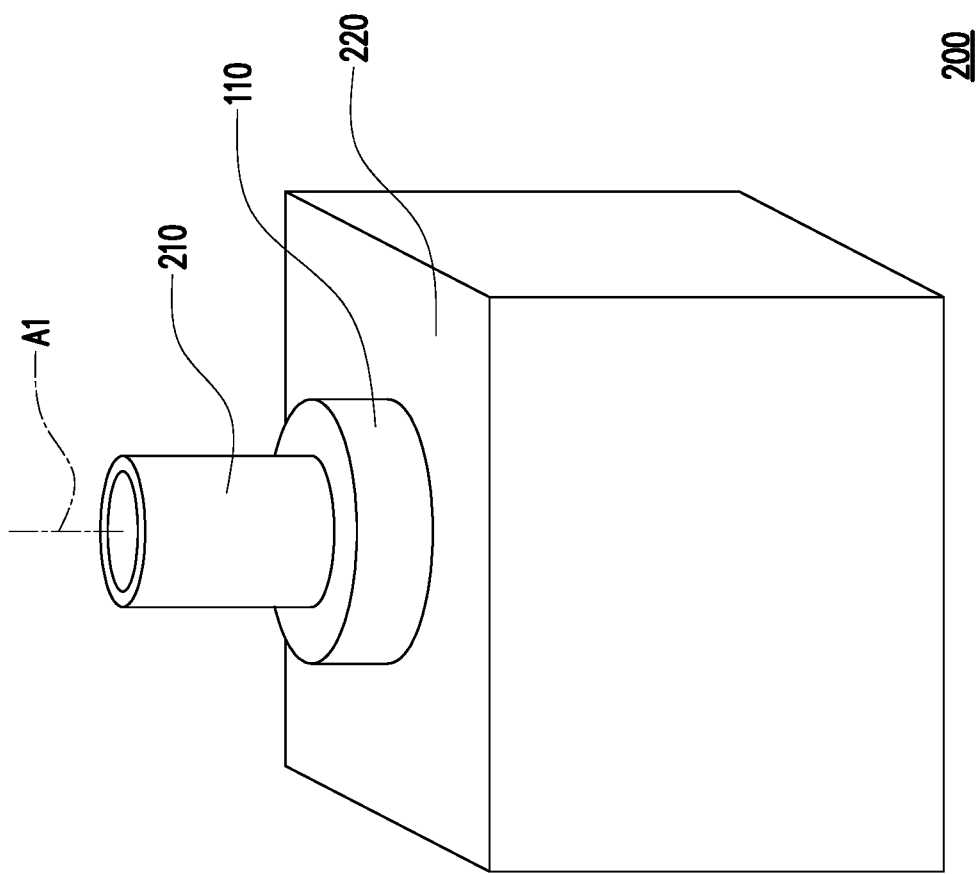
FIG. 1B is a schematic diagram of appearance of a projector adopting the system of changeable lens self-adaptive control and compensation of FIG. 1A.
Figure 2:
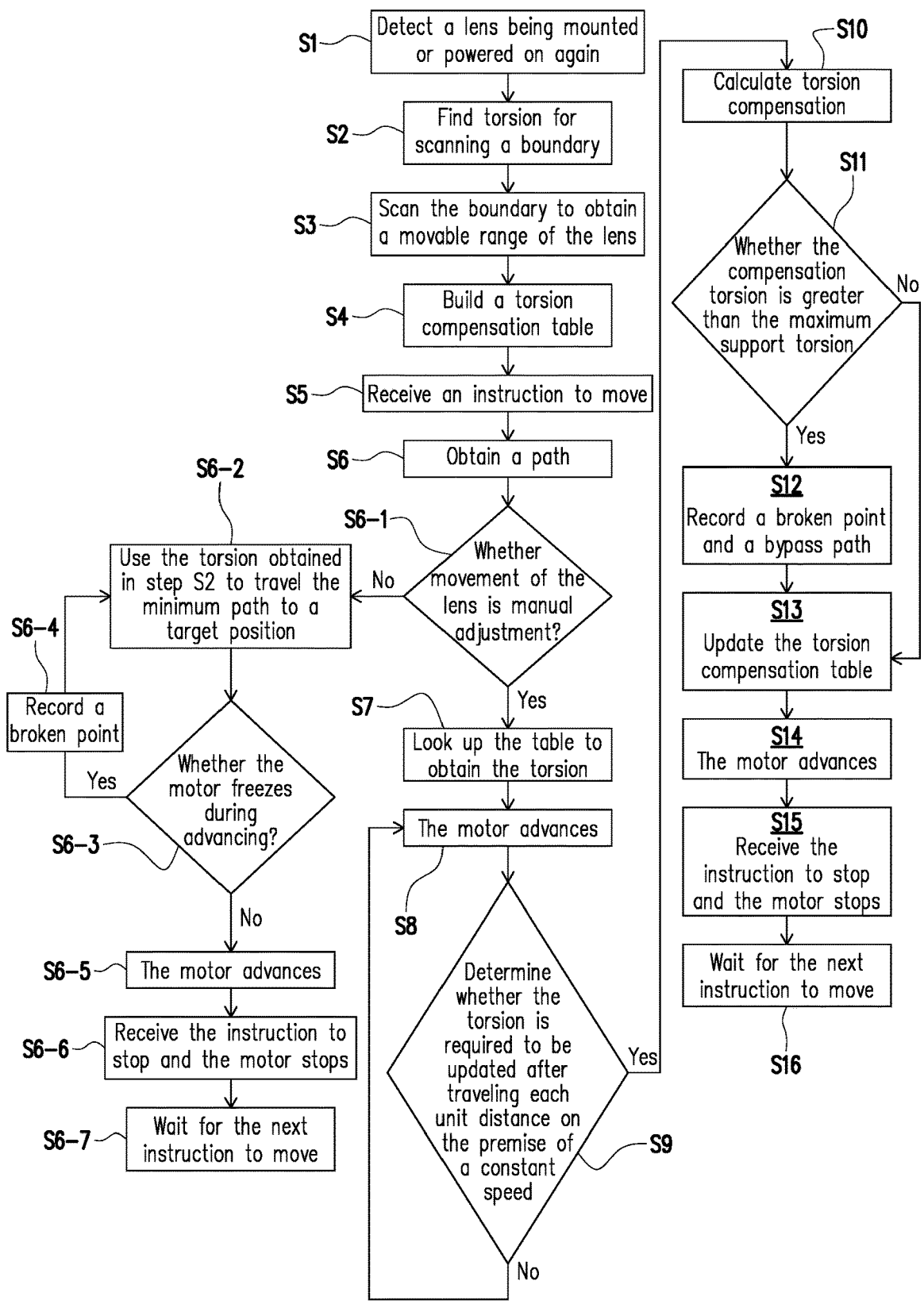
FIG. 2 is a flowchart of a method of changeable lens self-adaptive control and compensation performed by the system of changeable lens self-adaptive control and compensation of FIG. 1A.

FIG. 1A is a block diagram of a system of changeable lens self-adaptive control and compensation of an embodiment of the disclosure, FIG. 1B is a schematic diagram of appearance of a projector adopting the system of changeable lens self-adaptive control and compensation of FIG. 1A, and FIG. 2 is a flowchart of a method of changeable lens self-adaptive control and compensation performed by the system of changeable lens self-adaptive control and compensation of FIG. 1A. With reference to FIG. 1A, FIG. 1B, and FIG. 2, in this embodiment, a system of changeable lens self-adaptive control and compensation 100 may be applied to a projector 200. In this embodiment, the system of changeable lens self-adaptive control and compensation 100 includes a lens holder 110, an actuator 120, and a controller 130. The lens holder 110 is configured to carry a plurality of types of different lenses 210. The actuator 120 is connected to the lens holder 110 and is configured to drive the lens holder 110 to move, for example, to drive the lens holder 110 to move relative to a casing 220 of the projector 200. Specifically, the lens holder 110 moves in a direction perpendicular to an optical axis A1 relative to a display element in the casing 220 of the projector 200 to adjust the position of the image frame projected by the projector 200. For example, the display element includes a digital micro-mirror device (DMD), a liquid-crystal-on-silicon panel, a transmissive liquid crystal panel, an organic light-emitting diode display panel, or any other spatial light modulator (SLM). In this embodiment, the actuator 120 drives the lens holder 110 to move on a plane perpendicular to the optical axis A1 of the lens holder 110 (also the optical axis of a lens 210), for example, to move on a plane formed by the x direction and the y direction of FIG. 1B. The x direction and the y direction are perpendicular to the optical axis A1, and the x direction is perpendicular to the y direction.

The controller 130 is electrically connected to the actuator 120. When controlling the actuator 120 to drive the lens holder 110, the controller 130 is configured to determine whether maximum predetermined output torsion of the actuator 120 is incapable of driving the lens holder 110 when the lens holder 110 is at each of positions, and a lookup table corresponding to each of the positions is built. In addition, the controller 130 is configured to record a position to be a broken point in the lookup table in response to the maximum predetermined output torsion being incapable of driving the lens holder 110 when the lens holder 110 is at the position (as in steps S6-4 and S12 in FIG. 2).

In this embodiment, the actuator 120 includes a horizontally moving motor 122 and a vertically moving motor 124. The horizontally moving motor 122 is configured to drive the lens holder 110 to move in the x direction, and the vertically moving motor 124 is configured to drive the lens holder 110 to move in the y direction.

In addition, in this embodiment, the system of changeable lens self-adaptive control and compensation further includes a sensor 140. The sensor 140 is connected to the lens holder 110 and electrically connected to the controller 130. The sensor 140 is configured to sense a location of the lens holder 110. In an embodiment, the sensor 140 is a variable resistor, for example, and the controller 130 knows the position of the lens holder 110 according to resistance changes of the variable resistor.

In this embodiment, according to the recorded lookup table, the controller 130 is configured to avoid the position recorded to be a broken point in the lookup table at the next time when the actuator 120 drives the lens holder 110, as in the flow of returning from step S6-4 to step S6-2 of FIG. 2, or in steps S13 and S14 after step S12.

In this embodiment, a rotation speed corresponding to a driving torsion value of the actuator 120 is stored in each position of the lookup table, and the controller 130 is configured to perform the following steps. First, it is determined whether an instruction of a user to move the lens holder 110 is manual adjustment or automatic adjustment, as in step S6-1. Afterward, the lens holder 110 is moved according to the driving torsion value in the current position of the lookup table in response to the instruction to move the lens holder 110 being manual adjustment, as in steps S7 and S8. Then, it is determined whether the moving speed of the lens holder 110 meets a predetermined speed, as in step S9. Afterward, the rotation speed corresponding to the driving torsion value in the current position of the lookup table is updated for use at the next time when the lens holder 110 moves to the current position in response to the moving speed of the lens holder 110 not meeting the predetermined speed, as in step S10. Comparatively, the lens holder continues to be moved according to the driving torsion value of the lookup table in response to the moving speed of the lens holder 110 meeting the predetermined speed, as in the flow of returning from step S9 to step S8. In addition, the lens holder 110 is driven to a target position taking a shortest path at a maximum speed with minimum power consumption in response to the instruction to move the lens holder 110 being automatic adjustment, as in step 6-2.

In this embodiment, when manual adjustment is determined to be adopted in step S6-1, the controller 130 updates the rotation speed of the driving torsion value of the lookup table on the premise of moving the lens holder 110 at a constant speed, as in step S9. In this embodiment, the rotation speed stored in the lookup table includes a static frictional rotation speed and a kinetic frictional rotation speed. The rotation speed updated on the premise of a constant speed is the kinetic frictional rotation speed. The controller is configured to perform the following steps. First, the static frictional rotation speed of a position in the lookup table is not updated in response to the static frictional rotation speed being sufficient for the lens holder 110 at the position to move from rest. Comparatively, the static frictional rotation speed is updated and an updated static frictional rotation speed is stored in the lookup table in response to the static frictional rotation speed being insufficient for the lens holder 110 to move from rest, as in step S9.

In addition, in this embodiment, updating the driving torsion value in the current position of the lookup table includes the following steps. An interval where the driving torsion value in the current position is located in a rotation speed-torsion characteristic line of the actuator 120 is found. Next, a rotation speed corresponding to reducing or increasing one unit torsion is found as an updated rotation speed in the current position of the lookup table based on a speed adjustment direction according to the rotation speed-torsion characteristic line, as in step S10.

Furthermore, in this embodiment, the controller 130 is configured to command the actuator 120 to drive the lens holder 110 to scan a boundary of the lens 210 mounted thereon to obtain a movable range of the lens 210, as in step S3. In this embodiment, scanning the boundary of the lens 210 includes the following steps. First, torsion of the actuator 120 is gradually increased from minimum torsion until first torsion where the lens holder 110 is movable in at least three directions, then the first torsion is multiplied by a buffer coefficient corresponding to a weight of the lens 210 to obtain second torsion, and the second torsion is set as the maximum predetermined output torsion, as in step S2. Then, the lens holder 110 is moved with the maximum predetermined output torsion until the lens holder is not movable, the lens holder 110 is moved in another direction, and a moving boundary of the lens 210 is scanned, as in step S3.

In addition, in this embodiment, the controller 130 is configured to command the actuator 120 to drive the lens holder 110 to scan a boundary of another lens 210 (e.g., another lens with a different specification) in response to the another lens 210 being redisposed at the lens holder 110, as in step S1.

In this embodiment, the method of changeable lens self-adaptive control and compensation may be performed by the system of changeable lens self-adaptive control and compensation 100, and specific steps thereof are as shown in FIG. 2. In this embodiment, the method of changeable lens self-adaptive control and compensation may include at least some or all of the steps in FIG. 2.

In step S1, whether the lens 210 has been remounted on the lens holder 110 is determined by using a sensor, for example, determined by a microswitch. Alternatively, after the projector 200 is turned on, whether the position of the lens holder 110 is different from that before the previous shutdown is checked, and whether the lens 210 has been moved can be known accordingly. When the actuator 120 is not powered on, since there is no continuously output torsion, the lens 210 may be displaced from the original position due to the influence of an external force (e.g., gravity). As a result, parameters of the actuator may be modified for cases of being powered on and detecting position changes by rerunning the process flows.

Next, step S2 is performed. In step S2, torsion for scanning the boundary is found. During the development stage of the projector 200, the buffer coefficient is found using an experimental method with different models of the lens 210. In the embodiment of the disclosure, searching for the boundary may not directly impact the physical boundary, causing damage to the mechanism. The second torsion obtained from multiplying the first torsion by the buffer coefficient does not exceed maximum torsion of the system. The buffer coefficient is used to assume that the traveling distance completed with the second torsion from multiplying by the buffer coefficient is the boundary. The first torsion is the torsion that can overcome the maximum static friction.

Figure 3:
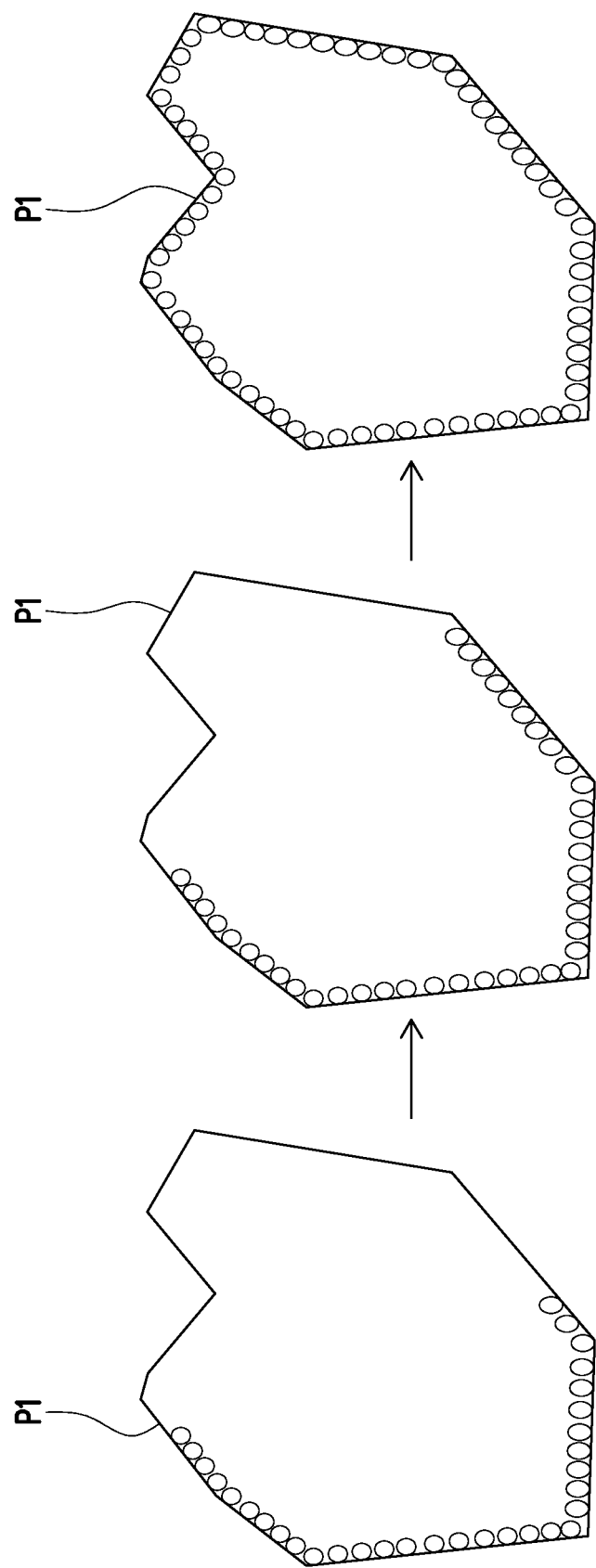
FIG. 3 is a schematic diagram of scanning a boundary of a movable range of a lens in the system of changeable lens self-adaptive control and compensation of FIG. 1A.

Further, step S3 is performed, where the boundary is scanned to obtain the movable range of the lens 210. First, the diagram of scanning a boundary in FIG. 3 is utilized to travel along a boundary P1 using the second torsion obtained in step S2 in a selected direction. The position of each point is recorded based on coordinates of each point compared with the center point. The boundary of the movable range of the lens 210 may be delineated by grouping these sampling points. In this way, when the system determines that the actuator 120 has reached the boundary, the actuator 120 may be stopped from continuously outputting torsion, preventing the lens 210 or the lens holder 110 from being damaged due to continuous impact.

Figure 4:
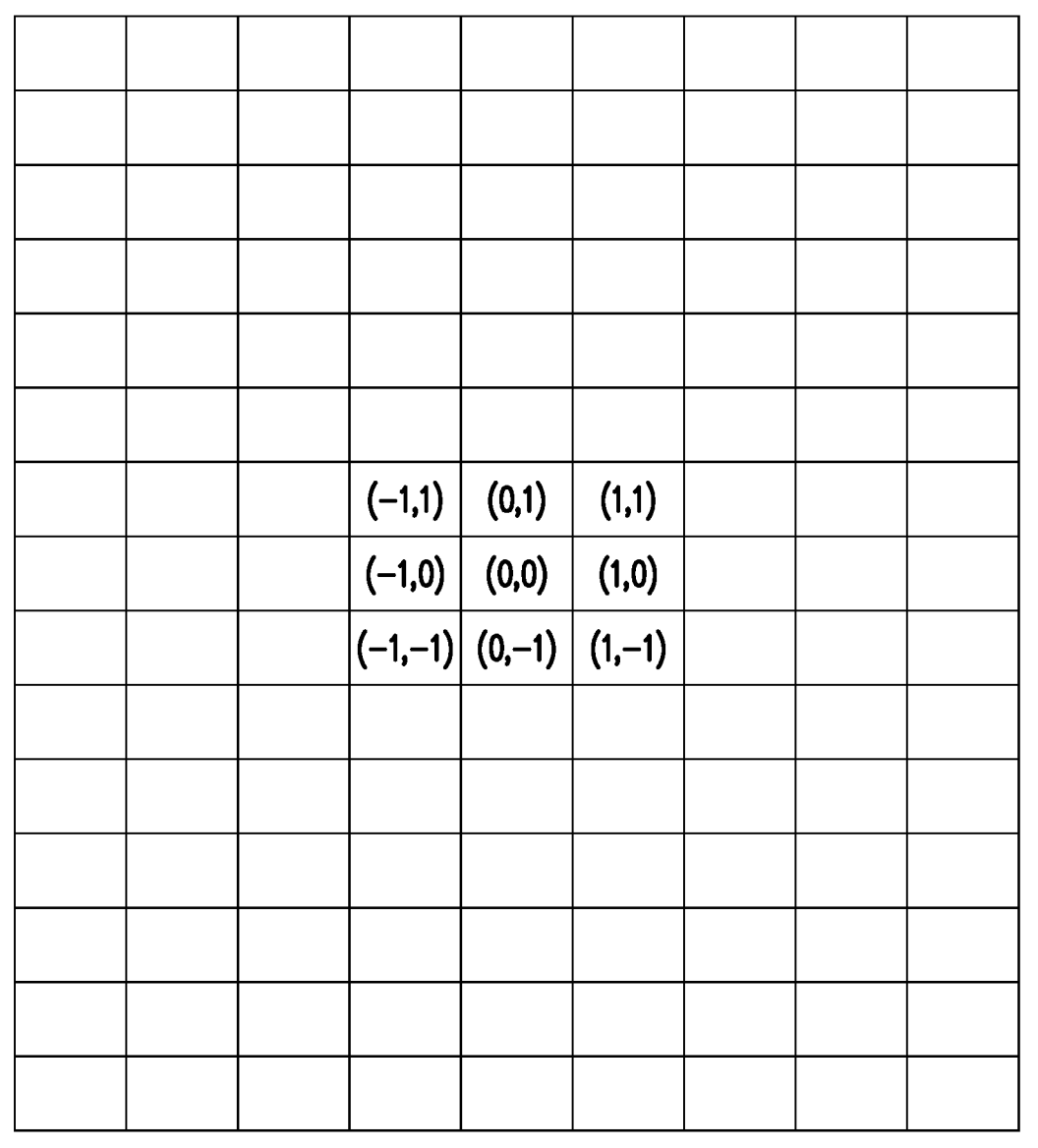

Then, step S4 is performed, where a torsion compensation table (i.e., the lookup table) is built. Specifically, within the movable range of the lens 210 surrounded by the boundary P1, the positions are managed and the positive and negative directions are distinguished by utilizing the unit distance from the center point. For example, coordinates of some of the positions are labeled in FIG. 4. Precision of the unit distance may be set depending on requirements. The value before the comma in the coordinates corresponds to the distance from the center point in the x direction, and the value after the comma in the coordinates corresponds to the distance from the center point in the y direction. In addition, in the built torsion compensation table, the kinetic frictional rotation speed and the static frictional rotation speed in each direction that are required are recorded at each coordinate point, as shown in FIG. 5. The table of FIG. 5 only shows 9 coordinate points as representatives, and lists the kinetic frictional rotation speed and the static frictional rotation speed of coordinates (0,1) as representatives. Nonetheless, each coordinate in fact has the corresponding positive x static frictional rotation speed, negative x static frictional rotation speed, positive y static frictional rotation speed, negative y static frictional rotation speed, positive x kinetic frictional rotation speed, negative x kinetic frictional rotation speed, positive y kinetic frictional rotation speed, and negative y kinetic frictional rotation speed. The positive x static frictional rotation speed refers to the rotation speed of the motor adopted by the horizontally moving motor 122 to overcome the static friction when moving the lens holder 110 in the positive x direction, the negative y kinetic frictional rotation speed refers to the rotation speed of the motor adopted by the vertically moving motor to overcome the kinetic friction when moving the lens holder 110 in the negative y direction, and the physical meanings of the other six rotation speed parameters may be deduced by analogy. In the beginning when the torsion compensation table as shown in FIG. 5 is built, a default torsion rotation speed is used as the parameters of all coordinate fields.

Further, step S5 is performed, where the instruction to move is received. In this embodiment, the movement modes of the lens 210 of the system are divided into two types. One is that the user manually presses the button or touches the user interface to command the lens 210 to advance (the system does not know the destination). The other is that the system with known destination directly moves the lens 210 to the designated position. The controller 130 sends the instruction to move to drive the actuator 120 based on different movement modes.

Next, step S6 is performed, where the moving path of the lens 210 is obtained. For example, the movement modes of the lens 210 are divided into manual adjustment and directly traveling to the designated position. For manual adjustment, the travel path is checked (e.g., whether there is a broken point and bypass is required is checked) from the record field of the current position of the lens 210 in the table before traveling. For directly traveling to the designated position, the lens holder 110 may be driven to a target position taking a shortest path, at a maximum speed, and/or with minimum power consumption.

Afterward, step S6-1 is performed to determine whether the movement of the lens 210 is manual adjustment. In the affirmative, step S7 is proceeded; in the negative, step S6-2 is proceeded.

In step S7, the controller 130 looks up the table to obtain the torsion of the current position. Assuming that advancing is in the direction from coordinates (0,1) to coordinates (−1,1), the table is checked first (i.e., the torsion compensation table in FIG. 5 is checked) to obtain the negative x static frictional rotation speed in the field of coordinates (0,1). If the rotation speed can be used to advance, it is determined that the negative x static frictional rotation speed is not required to be modified. After detection of the static friction, the lens 210 starts to be moved by employing the negative x kinetic frictional rotation speed in the field of coordinates (0,1). If the static frictional rotation speed recorded in the existing torsion compensation table cannot push the lens 210, the static friction is increased and the table is updated. Since there is a relationship line between the torsion and the rotation speeds (to be described later), obtaining the static frictional rotation speed or the kinetic frictional rotation speed by looking up the table is namely obtaining the torsion.

Further, step S8 is performed, where the motor advances, that is, the actuator 120 pushes the lens holder 110 to advance, that is, in this embodiment, the torsion or the rotation speed obtained in step S7 is used to drive the horizontally moving motor 122 or the vertically moving motor 124.

Afterward, step S9 is performed, where it is determined whether the torsion is required to be updated after traveling each unit distance on the premise of a constant speed. Since the resistive force for each unit distance is not necessarily the same, the speed of traveling through each grid with the same torsion may also be different. For this case, the elapsed time for traveling through each unit distance is calculated after traveling through that unit distance, and the traveling speed for each unit distance is compensated for with the aim of making lengths of the elapsed time for traveling each unit distance equal. For example, following the previous example, after learning from the feedback from the sensor 140 that the lens holder 110 has reached the position of coordinates (−1,1), a velocity v1 can be calculated using an elapsed time t1 for departing from (0,1) to (−1,1) and a distance s from (0,1) to (−1,1), as follows:

$$v1=s/t1$$

Assuming that the speed of other coordinate positions is v, if the difference |v−v1| is greater than a set difference threshold, it is determined that the speed requires additional compensation by torsion, and the flow goes to step S10; if the difference |v−v1| is not greater than the set difference threshold, it is determined that the torsion is not required to be updated, and the flow returns to step S8. A target rotation speed calculated from torsion compensation may be applied to the next time of passing through the same coordinate position, and then the feedback mechanism is utilized to check whether the speed reaches the set target to be consistent with other coordinate positions. If there is still a gap, the target rotation speed of torsion compensation is continued to be calculated to be applied to the next time of passing the same coordinate position. This torsion compensation table may infinitely approach perfection as the number of travels increases.

Figure 6:
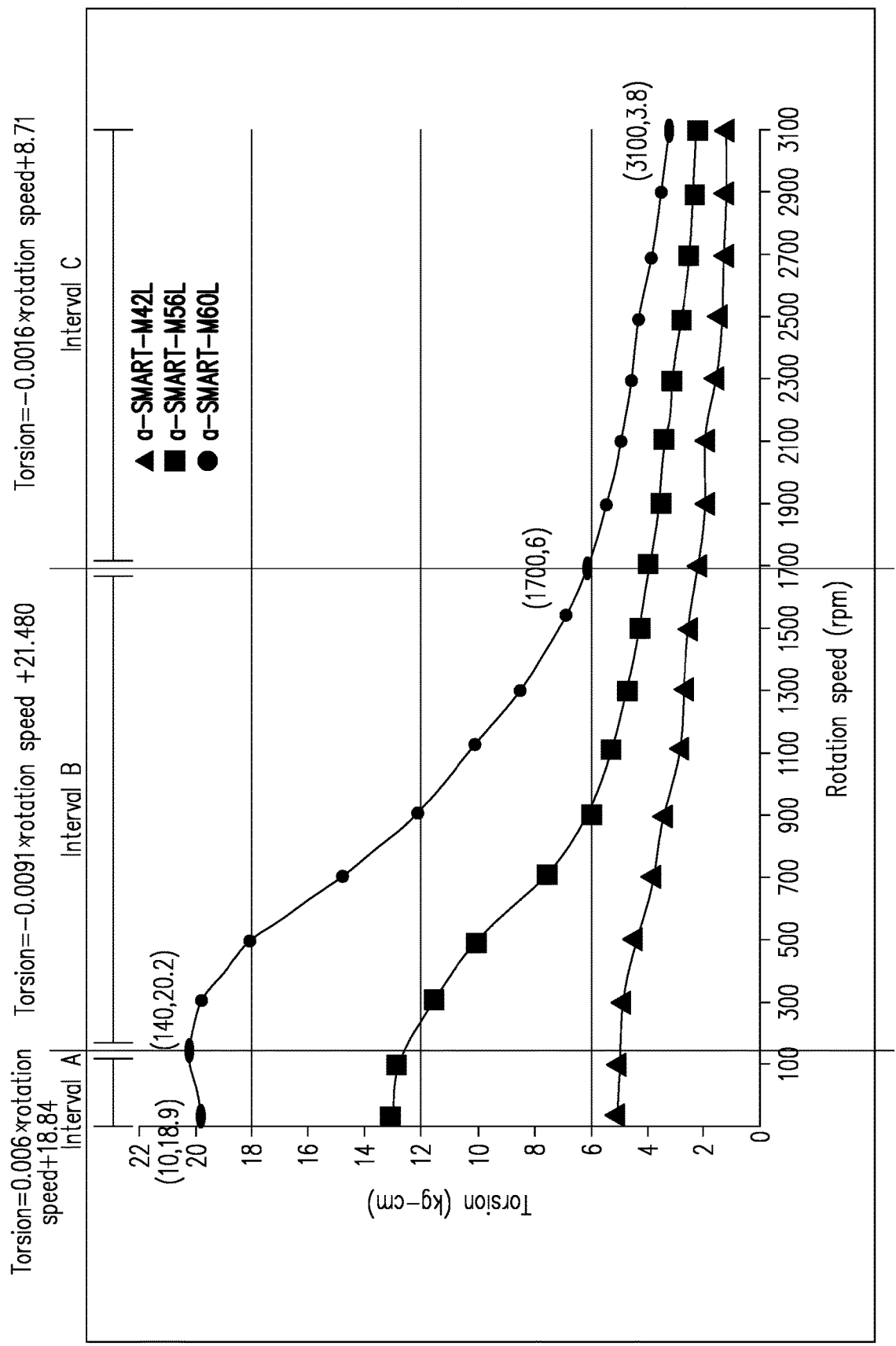
FIG. 6 shows torsion-rotation speed characteristic lines of motors in the system of changeable lens self-adaptive control and compensation of FIG. 1A.

In step S10, torsion compensation is calculated. Corresponding formulae are established for separate linear sections based on the torsion-rotation speed characteristic lines in the specification of the motor, as shown in FIG. 6. For example, intervals A, B, and C and corresponding formulae are obtained taking the motor numbered a-SMART-M60L in FIG. 6 as an example. First, the controller 130 checks the interval currently used by the torsion (e.g., checks whether it is the interval A, B, or C). Next, the rotation speed corresponding to reducing or increasing one unit torsion is found based on the speed adjustment direction. The characteristic lines corresponding to the numbers a-SMART-M42L and a-SMART-M56L in FIG. 6 are the characteristic lines of other two motors.

Next, step S11 is performed, where it is determined whether the compensation torsion is greater than the maximum support torsion. In step S11, the controller 130 checks whether the compensation torsion obtained in step S10 exceeds the maximum limit supported by the system (e.g., exceeds the maximum torsion supported by the motor). In the affirmative, step S12 is performed; in the negative, step S13 is performed.

Figure 8:
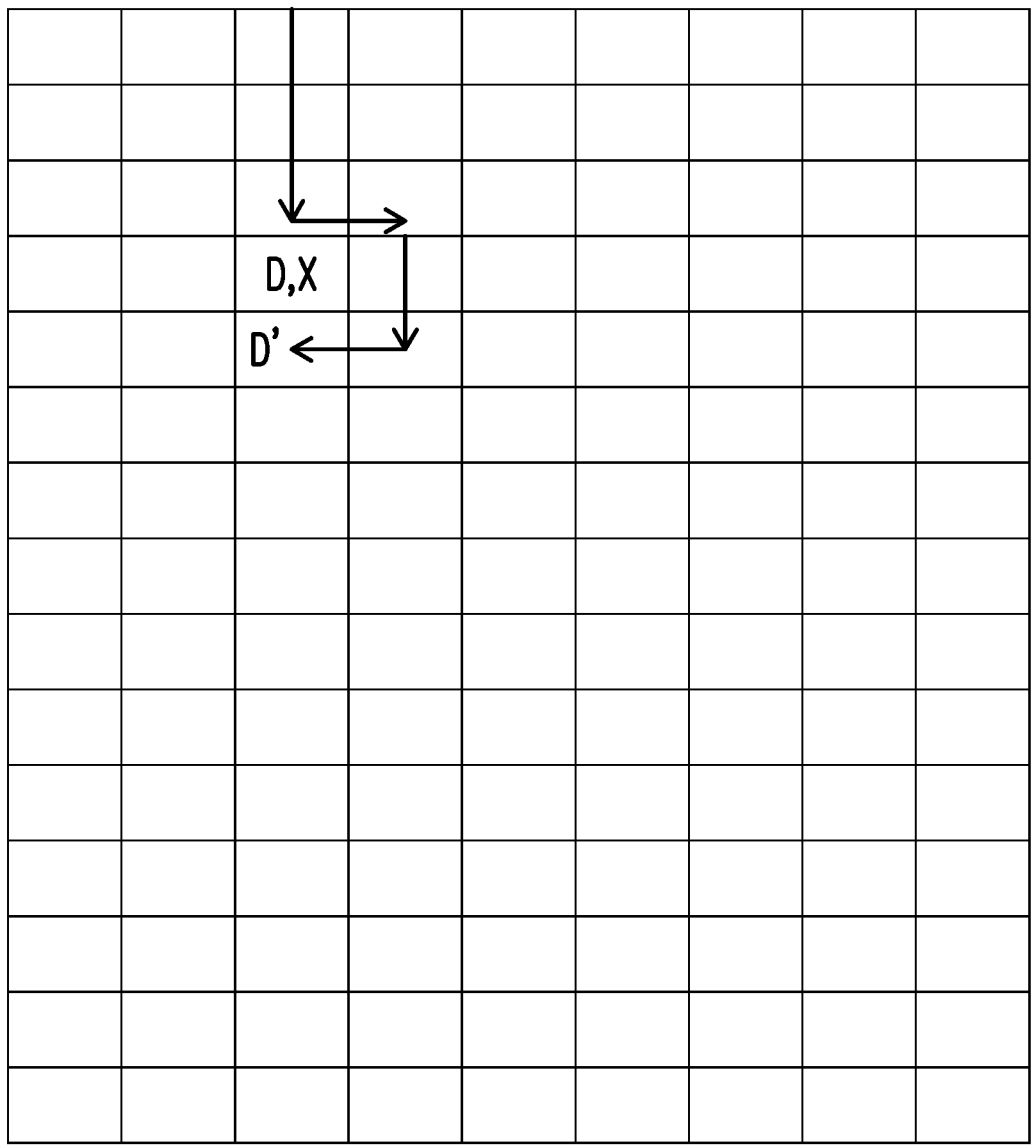
FIG. 8 is a schematic diagram of a broken point bypass mechanism of the system of changeable lens self-adaptive control and compensation of FIG. 1A.

In step S12, a broken point and a bypass path are recorded. If it is determined that the compensation torsion exceeds the limit in step S11, it indicates that entering this position from the current traveling direction is not applicable to the compensation mechanism. The current torsion direction and position are recorded together to be a broken point in the torsion compensation table, as shown in FIG. 7. In addition, as shown in FIG. 8, if the next position (i.e., a target position D) of this travel is a broken point X, the target position is modified to a point (i.e., a new target position D') adjacent to the broken point X in the same direction. The concept of the broken point bypass mechanism is described below. First, information is obtained from the current position. Next, information that the next position is to be bypassed is obtained. Then, the traveling direction is changed by an angle of +90 degrees. The motor continues to travel after changing the direction. Afterward, a position not requiring bypass is found to change the direction by −90 degree. Lastly, the minimum path for bypassing the broken point is found.

Afterward, step S13 is performed to update the torsion compensation table. In step S13, the torsion compensation or the broken point and the bypass path are updated if updating is required, and remain unchanged if updating is not required based on the progress of the process flows.

Further, step S14 is performed, where the motor advances, that is, the actuator 120 pushes the lens holder 110 to advance. In addition, the process flows from step S8 to step S12 are repeated each time the actuator 120 pushes the lens holder 110 by one unit distance.

Afterward, step S15 is performed, where the instruction to stop is received and the motor stops, that is, the instruction to stop the actuator 120 is received from the controller 130.

Further, step S16 is performed, where the next instruction to move is waited for. In step S16, delivery of control to the actuator 120 is stopped.

Figure 9B:
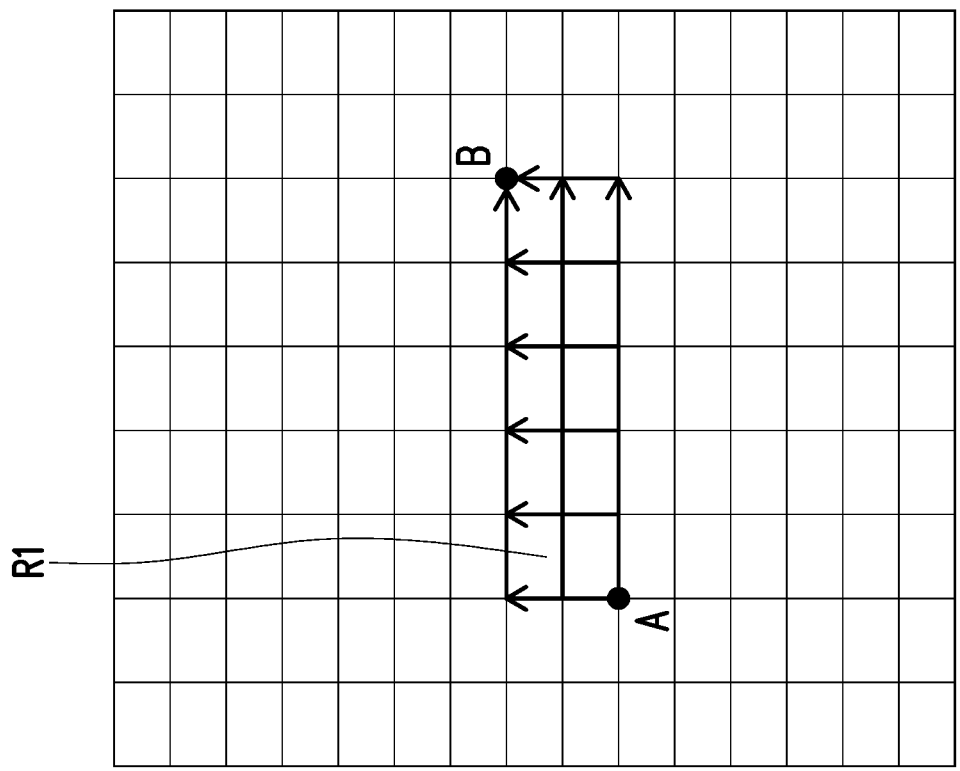
FIG. 9A and FIG. 9B are schematic diagrams showing flows of planning a lens travel route when a target position of the lens is known in the system of changeable lens self-adaptive control and compensation of FIG. 1A.
Figure 9A:
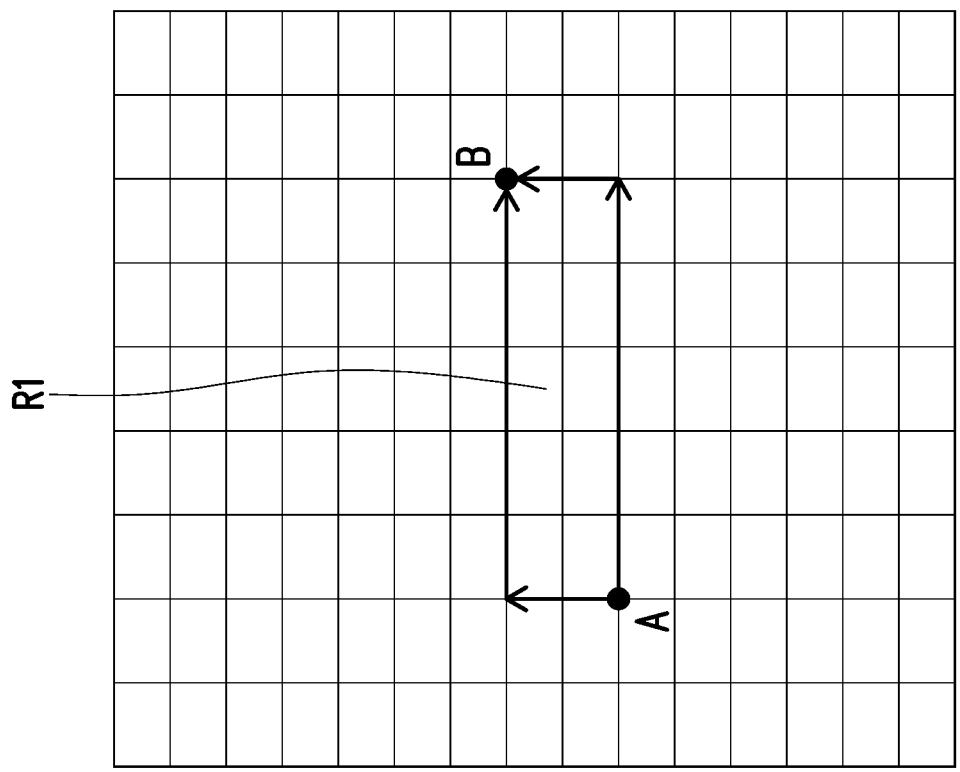

When it is determined to be negative in step S6-1, that is, when the movement of the lens 210 is automatic adjustment, step S6-2 is performed. For example, step S6-2 is using the torsion obtained in step S2 to travel the minimum path to a target position. For example, when the target position is known, quickly moving the lens 210 to the designated position is more important than fluency. Taking quickly moving the lens 210 as the aim, a range R1 surrounded by the minimum moving distances between a starting position A and a target position B in the x direction and the y direction is first found, as shown in FIG. 9A. Next, as shown in FIG. 9B, the routes within the range R1 are exhaustively identified. After the route with the least work accumulated from the static friction and the kinetic friction is found, the speed of the motor is adjusted to the highest speed supported by the system to travel. The aim of quickly moving the lens to the designated position is achieved by traveling through the route with the least accumulated resistive force (e.g., friction) using the maximum torsion that the system can support in addition to taking the shortest moving distance.

Next, step S6-3 is performed, where it is determined whether the motor freezes during advancing. In the affirmative, step S6-4 is performed; in the negative, step S6-5 is performed.

In step S6-4, a broken point is recorded, and a bypass path may be planned, as in step S12. Then, the flow returns to step S6-2.

In step S6-5, the motor advances, that is, the actuator 120 pushes the lens holder 110 to advance.

Then, step S6-6 is performed, where the instruction to stop is received and the motor stops, that is, the instruction to stop the actuator 120 is received from the controller 130.

Afterward, step S6-7 is performed, where the next instruction to move is waited for. In step S6-7, delivery of control to the actuator 120 is stopped.

In this embodiment, the system of changeable lens self-adaptive control and compensation 100 and the method of changeable lens self-adaptive control and compensation may have the following advantages and effects:
1. Additional design cost and firmware are not required. The system may be self-adaptive to a new lens, and may support the new lens directly after the new lens is mounted.
2. Environmental changes may affect the fluency of travel (e.g., the temperature may cause expansion and contraction of components). In this embodiment, this variable change may be compensated for.
3. Components with design tolerances may also affect the fluency of travel. It is not require to create a set of low-standard common settings to accommodate modules with adversely affected performance. In this embodiment, this variable difference may be compensated for, so that each individual lens 210 achieves respective optimal performance.
4. The combination of different lenses 210 is likely to cause unexpected cases in some sections of the movable space (e.g., an unsmooth travel or even freeze in some sections). In this embodiment, these unexpected cases can be addressed to through the broken point bypass path. In addition, directionality is further divided for unexpected broken points to achieve the aim of using the bypass accurately and preventing consumption of the lifespan of the motor.
5. If the lens 210 collides with edge components during movement, it may cumulatively damage the components over a long period of time. In this embodiment, the coordinate system is used to manage the boundary, and the output is automatically stopped when entering the boundary.

In summary of the foregoing, in the system and the method of changeable lens self-adaptive control and compensation of the embodiment of the disclosure, when the actuator is controlled to drive the lens holder, it is determined whether the maximum predetermined output torsion of the actuator is incapable of driving the lens holder when the lens holder is at each position, and a lookup table corresponding to each position is built. Moreover, a position is recorded to be a broken point in the lookup table in response to the maximum predetermined output torsion being incapable of driving the lens holder when the lens holder is at the position. As a result, in the system and the method of changeable lens self-adaptive control and compensation of the embodiment of the disclosure, self-adjustment of parameters for moving the lens can be made in response to different lenses or temporal or environmental changes to achieve self-adaptive control and compensation.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A system of changeable lens self-adaptive control and compensation, comprising:
   a lens holder configured to carry a plurality of types of different lenses;
   an actuator connected to the lens holder and configured to actuate movement of the lens holder; and
   a controller electrically connected to the actuator, the controller being configured to determine, when controlling the actuator to drive the lens holder, whether maximum predetermined output torsion of the actuator is incapable of driving the lens holder when the lens holder is at each of positions, and to build a lookup table corresponding to each of the positions, the controller being configured to record a position to be a broken point in the lookup table in response to the maximum predetermined output torsion being incapable of driving the lens holder when the lens holder is at the position.

2. The system according to claim 1, wherein the controller is configured to avoid the position recorded to be a broken point in the lookup table at the next time when the actuator drives the lens holder according to the recorded lookup table.

3. The system according to claim 1, further comprising a sensor connected to the lens holder and electrically connected to the controller, wherein the sensor is configured to sense a location of the lens holder.

4. The system according to claim 1, wherein the actuator drives the lens holder to move on a plane perpendicular to an optical axis of the lens holder.

5. The system according to claim 1, wherein a rotation speed corresponding to a driving torsion value of the actuator is stored in each position of the lookup table, and the controller is configured to:

determine whether an instruction of a user to move the lens holder is manual adjustment or automatic adjustment;

move the lens holder according to the driving torsion value in the current position of the lookup table in response to the instruction to move the lens holder being manual adjustment;

determine whether a moving speed of the lens holder meets a predetermined speed;

update the rotation speed corresponding to the driving torsion value in the current position of the lookup table for use at the next time when the lens holder moves to the current position in response to the moving speed of the lens holder not meeting the predetermined speed;

continue to move the lens holder according to the driving torsion value of the lookup table in response to the moving speed of the lens holder meeting the predetermined speed; and drive the lens holder to a target position taking a shortest path at a maximum speed with minimum power consumption in response to the instruction to move the lens holder being automatic adjustment.

6. The system according to claim 5, wherein the controller updates the rotation speed of the driving torsion value of the lookup table on the premise of moving the lens holder at a constant speed.

7. The system according to claim 6, wherein updating the driving torsion value in the current position of the lookup table comprises:

finding an interval where the driving torsion value in the current position is located in a rotation speed-torsion characteristic line of the actuator; and finding a rotation speed corresponding to reducing or increasing one unit torsion as an updated rotation speed in the current position of the lookup table based on a speed adjustment direction according to the rotation speed-torsion characteristic line.

8. The system according to claim 6, wherein the rotation speed stored in the lookup table comprises a static frictional rotation speed and a kinetic frictional rotation speed, the rotation speed updated on the premise of a constant speed is the kinetic frictional rotation speed, and the controller is configured to:

not update the static frictional rotation speed of a position in the lookup table in response to the static frictional rotation speed being sufficient for the lens holder at the position to move from rest; and update the static frictional rotation speed and store an updated static frictional rotation speed in the lookup table in response to the static frictional rotation speed being insufficient for the lens holder at the position to move from rest.

9. The system according to claim 1, wherein the controller is configured to command the actuator to drive the lens holder to scan a boundary of a lens mounted on the lens holder to obtain a movable range of the lens.

10. The system according to claim 9, wherein scanning the boundary of the lens comprises:

gradually increasing torsion of the actuator from minimum torsion until first torsion where the lens holder is movable in at least three directions, then multiplying the first torsion by a buffer coefficient corresponding to a weight of the lens to obtain second torsion, and setting the second torsion as the maximum predetermined output torsion; and moving the lens holder with the maximum predetermined output torsion until the lens holder is not movable, moving the lens holder in another direction, and scanning a moving boundary of the lens.

11. The system according to claim 9, wherein the controller is configured to command the actuator to drive the lens holder to scan a boundary of another lens in response to the another lens being redisposed at the lens holder.

12. A method of changeable lens self-adaptive control and compensation, comprising:

configuring an actuator to drive a lens holder to move, wherein the lens holder is configured to carry a plurality of types of different lenses;

when controlling the actuator to drive the lens holder, determining whether maximum predetermined output torsion of the actuator is incapable of driving the lens holder when the lens holder is at each of positions, and building a lookup table corresponding to each of the positions; and recording a position to be a broken point in the lookup table in response to the maximum predetermined output torsion being incapable of driving the lens holder when the lens holder is at the position.

13. The method according to claim 12, further comprising avoiding the position recorded to be a broken point in the lookup table at the next time when the actuator drives the lens holder according to the recorded lookup table.

14. The method according to claim 12, wherein a rotation speed corresponding to a driving torsion value of the actuator is stored in each position of the lookup table, and the method further comprises:

determining whether an instruction of a user to move the lens holder is manual adjustment or automatic adjustment;

moving the lens holder according to the driving torsion value in the current position of the lookup table in response to the instruction to move the lens holder being manual adjustment;

determining whether a moving speed of the lens holder meets a predetermined speed;

updating the rotation speed corresponding to the driving torsion value in the current position of the lookup table for use at the next time when the lens holder moves to the current position in response to the moving speed of the lens holder not meeting the predetermined speed;

continuing to move the lens holder according to the driving torsion value of the lookup table in response to the moving speed of the lens holder meeting the predetermined speed; and driving the lens holder to a target position taking a shortest path at a maximum speed with minimum power consumption in response to the instruction to move the lens holder being automatic adjustment.

15. The method according to claim 14, wherein the rotation speed of the driving torsion value of the lookup table is updated on the premise of moving the lens holder at a constant speed.

16. The method according to claim 15, wherein updating the driving torsion value in the current position of the lookup table comprises:

finding an interval where the driving torsion value in the current position is located in a rotation speed-torsion characteristic line of the actuator; and finding a rotation speed corresponding to reducing or increasing one unit torsion as an updated rotation speed in the current position of the lookup table based on a speed adjustment direction according to the rotation speed-torsion characteristic line.

17. The method according to claim 15, wherein the rotation speed stored in the lookup table comprises a static frictional rotation speed and a kinetic frictional rotation speed, the rotation speed updated on the premise of a constant speed is the kinetic frictional rotation speed, and the method further comprises:
not updating the static frictional rotation speed of a position in the lookup table in response to the static frictional rotation speed being sufficient for the lens holder at the position to move from rest; and
updating the static frictional rotation speed and storing an updated static frictional rotation speed in the lookup table in response to the static frictional rotation speed being insufficient for the lens holder at the position to move from rest.

18. The method according to claim 12, further comprising commanding the actuator to drive the lens holder to scan a boundary of a lens mounted on the lens holder to obtain a movable range of the lens.

19. The method according to claim 18, wherein scanning the boundary of the lens comprises:
gradually increasing torsion of the actuator from minimum torsion until first torsion where the lens holder is movable in at least three directions, then multiplying the first torsion by a buffer coefficient corresponding to a weight of the lens to obtain second torsion, and setting the second torsion as the maximum predetermined output torsion; and
moving the lens holder with the maximum predetermined output torsion until the lens holder is not movable, moving the lens holder in another direction, and scanning a moving boundary of the lens.

20. The method according to claim 18, further comprising commanding the actuator to drive the lens holder to scan a boundary of another lens in response to the another lens being redisposed at the lens holder.

* * * * *